(12) United States Patent
Weh et al.

(10) Patent No.: US 12,351,141 B2
(45) Date of Patent: Jul. 8, 2025

(54) HYDRAULIC BLOCK FOR A HYDRAULIC POWER UNIT OF A HYDRAULIC POWER VEHICLE BRAKING SYSTEM

(71) Applicant: Robert Bosch GmbH, Stuttgart (DE)

(72) Inventors: Andreas Weh, Sulzberg (DE); Martin Hagspiel, Rettenberg (DE); Matthias Mayr, Rettenberg (DE); Stefan Kaserer, Ofterschwang (DE)

(73) Assignee: ROBERT BOSCH GMBH, Stuttgart (DE)

( * ) Notice: Subject to any disclaimer, the term of this patent is extended or adjusted under 35 U.S.C. 154(b) by 361 days.

(21) Appl. No.: 17/774,035

(22) PCT Filed: Oct. 29, 2020

(86) PCT No.: PCT/EP2020/080386
§ 371 (c)(1),
(2) Date: May 3, 2022

(87) PCT Pub. No.: WO2021/104790
PCT Pub. Date: Jun. 3, 2021

(65) Prior Publication Data
US 2022/0379861 A1 Dec. 1, 2022

(30) Foreign Application Priority Data
Nov. 28, 2019 (DE) .................... 10 2019 218 481.2

(51) Int. Cl.
*B60T 13/74* (2006.01)
*B60T 8/36* (2006.01)
(Continued)

(52) U.S. Cl.
CPC ............ *B60T 13/161* (2013.01); *B60T 8/368* (2013.01); *B60T 13/686* (2013.01); *B60T 13/745* (2013.01); *B60T 17/08* (2013.01)

(58) Field of Classification Search
CPC .... B60T 13/745; B60T 13/161; B60T 13/686; B60T 8/368; B60T 11/236; B60T 17/08
See application file for complete search history.

(56) References Cited

U.S. PATENT DOCUMENTS 8,096,122 B2 * 1/2012 Ikeda ..................... B60T 11/20
60/545
8,387,381 B2 * 3/2013 Ohno .................... B60T 13/746
60/545
(Continued)

FOREIGN PATENT DOCUMENTS

CN 102431534 A 5/2012
CN 102431535 A 5/2012
(Continued)

OTHER PUBLICATIONS

International Search Report for PCT/EP2020/080386, Issued Dec. 10, 2020.

*Primary Examiner* — Bradley T King
(74) *Attorney, Agent, or Firm* — NORTON ROSE FULBRIGHT US LLP

(57) ABSTRACT

A power piston in a power cylinder borehole of a hydraulic block of a hydraulic power unit of a hydraulic power vehicle braking system is only guided radially in an axially delimited guide section. The power cylinder borehole is configured with a larger diameter axially outside the guide section. A brake fluid channel extends through the guide section up to an opening of a brake fluid line.

11 Claims, 1 Drawing Sheet

(51) Int. Cl.
  *B60T 13/16* (2006.01)
  *B60T 13/68* (2006.01)
  *B60T 17/08* (2006.01)

(56) References Cited

U.S. PATENT DOCUMENTS

| | | | |
|---|---|---|---|
| 9,283,943 B2* | 3/2016 | Sakuma | B60T 11/232 |
| 9,568,026 B2* | 2/2017 | Yoshimoto | B60T 13/745 |
| 2008/0092537 A1* | 4/2008 | Inoue | B60T 8/4275 |
| | | | 60/585 |
| 2011/0155414 A1* | 6/2011 | Yasukawa | H02M 7/003 |
| | | | 174/68.2 |
| 2011/0259005 A1* | 10/2011 | Kikuchi | B60T 8/368 |
| | | | 60/545 |
| 2015/0360660 A1* | 12/2015 | Matsumura | F16J 1/001 |
| | | | 92/169.1 |
| 2017/0137005 A1* | 5/2017 | Weh | F04B 23/025 |
| 2017/0166177 A1* | 6/2017 | Weh | B60T 8/368 |
| 2017/0282879 A1* | 10/2017 | Matsunaga | B60T 11/165 |
| 2018/0345934 A1 | 12/2018 | Weh et al. | |
| 2019/0031164 A1* | 1/2019 | Tandler | B60T 8/368 |
| 2019/0100172 A1* | 4/2019 | Lee | B60T 7/042 |
| 2019/0100181 A1* | 4/2019 | Kobayashi | B60T 8/00 |
| 2021/0188232 A1* | 6/2021 | Mayr | B60T 8/4081 |
| 2021/0388829 A1* | 12/2021 | Weh | F04B 39/122 |
| 2022/0363231 A1* | 11/2022 | Weh | F04B 9/02 |
| 2023/0303049 A1* | 9/2023 | Kobori | F16K 15/063 |
| 2024/0116485 A1* | 4/2024 | Weh | B60T 13/745 |
| 2024/0157925 A1* | 5/2024 | Weh | B60T 17/00 |

FOREIGN PATENT DOCUMENTS

| | | |
|---|---|---|
| CN | 104884316 A | 9/2015 |
| DE | 102005045937 A1 | 3/2007 |
| DE | 102014106533 A1 | 11/2015 |
| DE | 102015225712 A1 | 6/2017 |
| DE | 102017214593 A1 | 2/2019 |
| JP | 2003137084 A | 5/2003 |
| JP | 2005178620 A | 7/2005 |
| JP | 2012210906 A | 11/2012 |
| JP | 2018533521 A | 11/2018 |
| WO | 2013023953 A1 | 2/2013 |
| WO | 2017089007 A1 | 6/2017 |
| WO | 2019037967 A1 | 2/2019 |

* cited by examiner

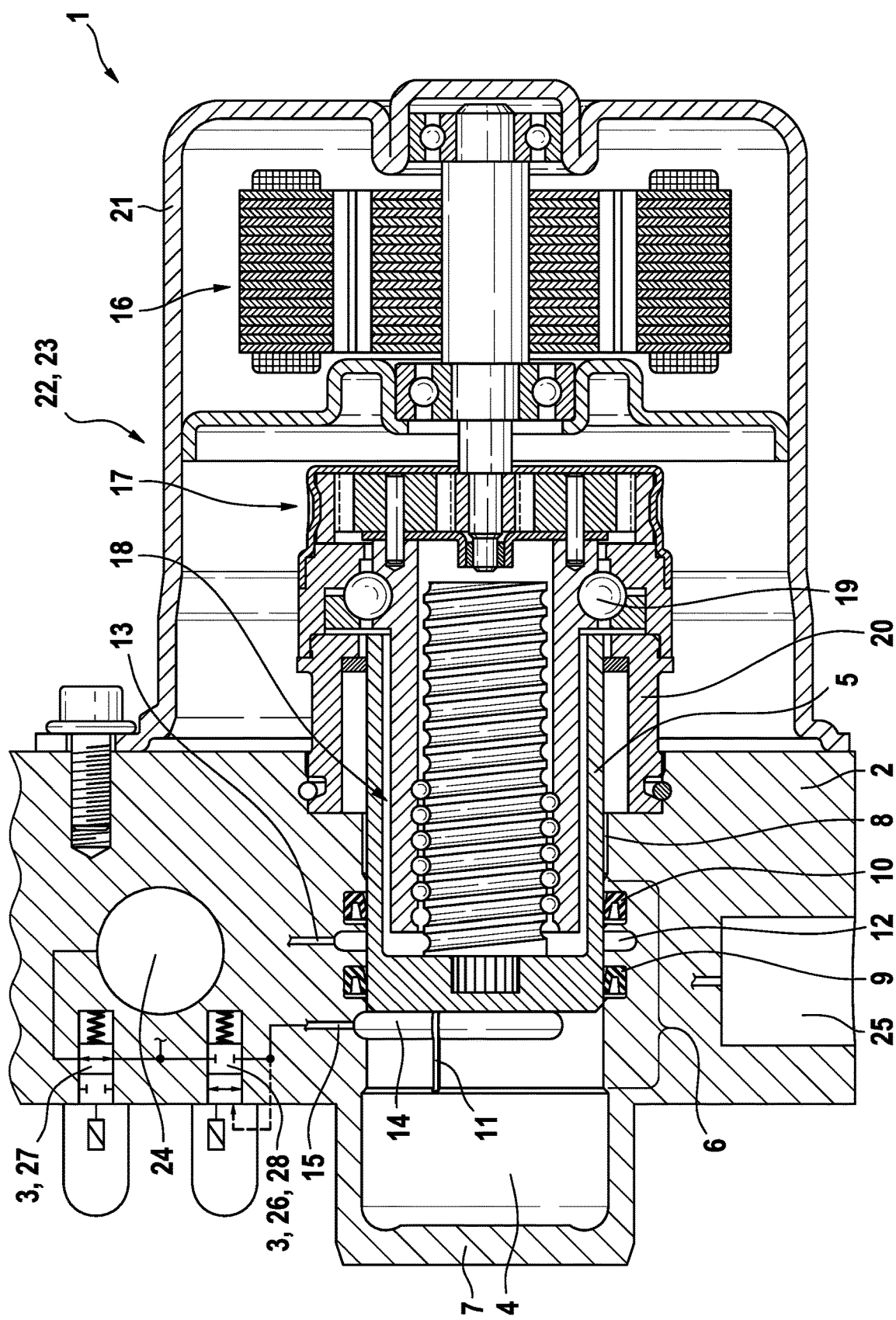

HYDRAULIC BLOCK FOR A HYDRAULIC POWER UNIT OF A HYDRAULIC POWER VEHICLE BRAKING SYSTEM

FIELD

The present invention relates to a hydraulic block for a hydraulic power unit of a hydraulic vehicle braking system.

BACKGROUND INFORMATION

PCT Patent Application No. WO 2013/023 953 A1 describes a hydraulic power unit for a slip-controlled hydraulic power vehicle braking system. The hydraulic power unit includes a hydraulic block in which a master brake cylinder borehole is provided, in which a master brake cylinder piston for a muscle power actuation of the vehicle braking system is axially displaceably accommodated. The master brake cylinder piston may be displaced in the master brake cylinder borehole via a pedal rod, which is connected to the master brake cylinder piston and to a foot brake pedal in an articulated manner. For a power actuation of the vehicle braking system, the hydraulic block includes a power cylinder borehole in which a power piston is displaceable by an electric motor via a worm gear.

SUMMARY

The hydraulic block according to an example embodiment of the present invention is provided for a hydraulic power unit of a hydraulic, in particular slip-controlled, power vehicle braking system. Slip controllers are, in particular, an anti-lock braking unit, a traction control unit and/or vehicle dynamics control unit/electronic stability program, for which the abbreviations ABS, TCS and/or VDC/ESP are common. The latter are also colloquially referred to as "anti-skid control units." Slip controllers are conventional and are not discussed in greater detail here.

The hydraulic block is used to mechanically attach and hydraulically interconnect hydraulic components of the vehicle braking system or its brake pressure control and/or slip control. Such hydraulic components are, among other things, solenoid valves, check valves, hydraulic accumulators, damper chambers, and pressure sensors. The hydraulic components are attached in receptacles in the hydraulic block, which are usually designed as cylindrical through-holes or blind holes, partially with stepped diameters. "Interconnection" means that the receptacles or the hydraulic components fastened therein are connected by lines in the hydraulic block corresponding to a hydraulic diagram of the vehicle braking system or its slip controller. The lines are typically drilled in the hydraulic block.

Equipped with the hydraulic components of the vehicle braking system or its slip controller, the hydraulic block forms a hydraulic power unit, "equipped" meaning that the hydraulic components are fastened in the respective receptacles of the hydraulic block intended for them.

Hydraulic wheel brakes of the vehicle braking system are or become connected to the hydraulic block via brake lines.

For a power actuation of the vehicle braking system, the hydraulic block according to the present invention includes a power cylinder borehole in which a power piston is axially displaceably accommodated. The power cylinder borehole is often also referred to as a plunger cylinder, and the power piston as a plunger piston. For generating a brake pressure, the power piston is displaceable in the power cylinder borehole with the aid of a power drive, which, for example, includes an electric motor and a threaded drive. For the axially displaceable guidance of the power piston, the power cylinder borehole includes a guide section, which extends over a portion of an axial length of the power cylinder borehole and radially guides the power piston. In particular, the power cylinder borehole, in the guide section, has the same diameter as the power piston. In the guide section, the power cylinder borehole may also have a slightly larger diameter than the power piston, which is necessary for the power piston to be axially displaceable without jamming. Outside the guide section, the power cylinder borehole has a larger diameter so that the power piston there preferably does not rest against a circumferential surface of the power cylinder borehole.

The power piston is sealed with a piston seal, in particular a sealing ring, in the power cylinder borehole. According to the present invention, the guide section of the power cylinder borehole for the power piston is situated on a pressure side of the piston seal. The pressure side is the side on which the power piston, during its displacement in the power cylinder borehole, generates a brake pressure for actuating the vehicle braking system. The guide section thus extends from the piston seal into a working chamber of the power cylinder borehole, which the power piston delimits on one side and whose volume the power piston decreases during its displacement for the brake actuation, to displace brake fluid out of the working chamber in the direction of hydraulic wheel brakes. The guide section of the power cylinder borehole for the power piston may end at the piston seal or may extend, on a side situated opposite the pressure side, beyond the piston seal, for example up to a second piston seal.

According to the present invention, the hydraulic block includes a brake fluid channel in the circumferential surface of the power cylinder borehole in the guide section on the pressure side of the power piston, which extends up to the piston seal. For example, the brake fluid channel is a furrow or a groove in the guide section of the power cylinder borehole and may, for example, extend in an axially parallel or a helical line manner. Through the brake fluid channel, brake fluid from the working chamber of the power cylinder borehole reaches the piston seal for lubrication. Through the brake fluid channel, the working chamber of the power cylinder borehole communicates with a brake fluid line, which opens into the power cylinder borehole inside the guide section. Through the brake fluid line, the working chamber of the power cylinder borehole communicates, for example, with a brake fluid reservoir and/or with the wheel brakes.

Holes in the hydraulic block referred to here as "boreholes," such as for example the power cylinder borehole or a master brake cylinder borehole, may also be created in a manner other than boring.

Refinements and advantageous embodiments of the present invention are disclosed herein.

All features described herein and shown in the FIGURE may be implemented in specific embodiments of the present invention either alone or in a generally arbitrary combination. Embodiments of the present invention which do not include all, but only one or multiple features of a specific embodiment of the present invention are generally possible.

BRIEF DESCRIPTION OF THE DRAWING

The present invention is described in greater detail hereafter based on one specific embodiment shown in the FIGURE.

FIG. 1 shows a section of a hydraulic block according to an example embodiment of the present invention axially through a power cylinder borehole.

DETAILED DESCRIPTION OF EXAMPLE EMBODIMENTS

Hydraulic power unit 1 according to an example embodiment of the present invention shown in FIG. 1 is provided for a brake pressure generation in a hydraulic power vehicle braking system including a slip controller. Such slip controllers are, for example, anti-lock braking units, traction control units and/or vehicle dynamics control units/electronic stability programs, for which the abbreviations ABS, TCS and VDC/ESP are common.

Hydraulic power unit 1 according to the present invention includes a hydraulic block 2 for a mechanical attachment and hydraulic interconnection of hydraulic and other components of the slip controller, such as solenoid valves, check valves, hydraulic accumulators and damper chambers. The components are situated at and in hydraulic block 1 and hydraulically connected to one another by a bore of hydraulic block 2, which is not shown, corresponding to a hydraulic diagram of the power vehicle braking system and the slip controller. Two solenoid valves 3 are shown as graphical symbols by way of example.

In the illustrated and described specific embodiment of the present invention, hydraulic block 2 is a cuboidal, flat metal block made of, for example, an aluminum alloy, which is provided with boreholes for accommodating the components of the slip controller and includes boreholes corresponding to the hydraulic diagram of the vehicle braking system and the slip controller.

Hydraulic block 2 includes a power cylinder borehole 4 in which a power piston 5 is axially displaceably accommodated. Power cylinder borehole 4 extends transversely through hydraulic block 2 and is open at one end. At another, closed end on an opposing side of hydraulic block 2, hydraulic block 2 includes an outwardly projecting, cylindrical cup-shaped molding 7, which is integral with hydraulic block 2 and coaxial to power cylinder borehole 4 and which axially elongates power cylinder borehole 4. For an axially displaceable guidance of power piston 5, power cylinder borehole 4 includes a guide section 6, which extends in the axial direction over a portion of a length of power cylinder borehole 4 and radially guides power piston 5 in power cylinder borehole 4. In guide section 6, power cylinder borehole 4 has the same diameter as power piston 5. In guide section 6, the diameter of power cylinder borehole 4 may also be slightly larger by so much that power piston 5 has play and is axially displaceable without jamming. Axially on either side outside guide section 6, power cylinder borehole 4 has a larger diameter than power piston 5, so that an annular gap 8 which encloses power piston 5 exists.

In guide section 6, power cylinder borehole 4 includes two axially spaced, circumferential sealing grooves, in each of which a piston seal 9, 10 is situated, which provide sealing between power cylinder borehole 4 and power piston 5. Piston seal 9 facing molding 7 may also be interpreted as a high pressure seal 9, and piston seal 10 facing the open end of power cylinder borehole 4 may also be interpreted as a low pressure seal 10. The two piston seals 9, 10 are sealing rings made of an elastomer or another, elastically deformable plastic or another material. Piston seals 9, 10 are made exclusively of the elastomer and include no support rings, support webs or other support elements, or the like, made of metal or, for example, a deformation-resistant plastic. In the exemplary embodiment, the two piston seals 9, 10 are lip seals including a sealing lip which extends around the inside and rests sealingly against an outer circumference of power piston 5.

In the direction of the open end of power cylinder borehole 4, guide section 6 ends at low pressure seal 10 or continues axially a short distance of preferably no more than one millimeter or several millimeters over low pressure seal 10. In the direction of molding 7, guide section 6 continues by approximately half a distance between guide piston 5 in its shown, retracted basic position from the closed end of power cylinder borehole 4 in molding 7. The retracted basic position of power piston 5 is the position which, during its operation, is situated furthest away from the closed end of power cylinder borehole 4.

The sides of power piston 5 and of high pressure seal 9 facing the closed end are their pressure sides since power piston 5, during a displacement into molding 7, generates a brake pressure in molding 7, and thus in power cylinder borehole 4.

On the pressure side of power piston 5 or of high pressure seal 9, guide section 6 includes a trench as brake fluid channel 11, which extends up to power piston 5 in the retracted basic position or up to high pressure seal 9. Brake fluid channel 11 may, as shown in the drawing, extend axially parallel or, for example, also helically (not shown). Multiple brake fluid channels 11 may be present, distributed over the circumference (not shown).

Between the two piston seals 9, 10, power cylinder borehole 4 includes a circumferential groove 12 into which a brake fluid line 13 opens, which leads to a non-illustrated brake fluid reservoir placed onto hydraulic block 2. Through brake fluid line 13 and groove 12, brake fluid reaches the circumference of power piston 5 for lubricating power piston 5 and piston seals 9, 10, power piston distributing the brake fluid in the axial direction during an axial displacement in power cylinder borehole 4 so that power piston 5 in guide section 6 of power cylinder borehole 4 and piston seals 9, 10 are lubricated.

Directly at the pressure-side end of power piston 5 in the retracted basic position, power cylinder borehole 4 includes a further, circumferential groove 14, which extends over a limited circumferential section and into which also a brake fluid line 15 opens, by which hydraulic wheel brakes, which are not shown and connected by brake lines to hydraulic block 2, are connected via solenoid valves 3 to power cylinder borehole 4. By displacing power piston 5 in the direction of the closed end, a brake pressure may be generated in power cylinder borehole 4 for an actuation of the wheel brakes. Through brake fluid channel 11, which extends through guide section 6 of power cylinder borehole 4 up to groove 14, groove 14 and brake line 15 opening into it also communicate with power cylinder borehole 4 between power piston 5 and the closed end of power cylinder borehole 4 when power piston 5 is displaced, since brake fluid channel 11 extends into a portion of power cylinder borehole 4, between guide section 6 and the closed end of power cylinder borehole 4, which has a larger diameter.

As is apparent in FIG. 1, high pressure seal 9 also provides sealing at power piston 5 in the retracted basic position thereof, and there is no displacement position of power piston 5 in which high pressure seal 9 does not provide sealing at power piston 5. In this way, dead travel is avoided and during its displacement in power cylinder borehole 4, power piston 5, proceeding from its retracted basic position, displaces brake fluid out of power cylinder borehole 4 from the start.

For the displacement of power piston 5 in power cylinder borehole 4 for generating a brake pressure using external power, hydraulic power unit 1 includes an electric motor 16, which displaces power piston 5 via a planetary gear 17 as a reduction gear and a ball screw 18 in power cylinder borehole 4. Ball screw 18 may, generally speaking, also be interpreted as a worm gear or as a rotatory/translatory conversion gear. Ball screw 18 is partially situated in power piston 5 coaxially to power piston 5 and to power cylinder borehole 4, the power piston being designed as a hollow piston for this purpose. Ball screw 18 is rotatably mounted with the aid of a ball bearing 19, which is situated with a tubular bearing holder 20 on the outside of hydraulic block 2. Planetary gear 17 is also situated coaxially to power cylinder borehole 4 and to power piston 5, between ball screw 18 and electric motor 16. Electric motor 16 includes a motor housing 21, which is also screwed to the outside of hydraulic block 2, coaxially to power cylinder borehole 4 and to power piston 5. Electric motor 16, planetary gear 17, and ball screw 18 form an electromechanical power drive 22, by which power piston 5 is axially displaceable in power cylinder borehole 4 for generating the brake pressure for the vehicle braking system using external power. Together with power cylinder borehole 4 and power piston 5, power drive 22 forms a power brake pressure generator 23 of hydraulic power unit 1 according to the present invention. The present invention does not preclude a generation of the brake pressure using external power other than the electromechanical generation.

In the illustrated and described specific embodiment of the present invention, hydraulic block 2 includes a master brake cylinder bore 24, in which a master brake cylinder piston (not shown) is situatable, which is mechanically displaceable via a piston rod with the aid of a foot brake pedal, which is not shown, or a hand brake lever in master brake cylinder borehole 24. Furthermore, hydraulic block 2 includes a simulator cylinder borehole 25 for a simulator piston, which is not shown and, for example, is acted upon by a spring. From master brake cylinder borehole 24, brake fluid is displaceable into simulator cylinder borehole 25 to be able to displace the master brake cylinder piston in master brake cylinder borehole 24 during a power actuation of the vehicle braking system. In addition to power brake pressure generator 23, the vehicle braking system may also be actuated by muscle power by the displacement of the master brake cylinder piston in master brake cylinder borehole 24, which is, in particular, provided in the event of a malfunction or a failure of power brake pressure generator 23.

Power cylinder borehole 4, master brake cylinder borehole 24 and/or simulator cylinder borehole 25 may also be created in a manner other than boring.

Power cylinder borehole 4 or power brake pressure generator 23 is connected to the hydraulic wheel brakes by one or two separating valve(s) 26 which is/are hydraulically connected in parallel, and with the aid of intake valves, not shown, which are hydraulically connected in series with separating valves 26. Moreover, power cylinder borehole 4 or power brake pressure generator 23 is connected to master brake cylinder borehole 24 or to the brake fluid reservoir, which is not shown, by separating valves 26 and suction valves 27 hydraulically connected thereto in series. A differential pressure valve 28, which limits a maximum pressure in power cylinder borehole 4, is integrated into at least one separating valve 26. In this way, an impermissibly high pressure in power cylinder borehole 4, for example also in the event of a thermal expansion of the brake fluid in power cylinder borehole 4, is prevented, without displacement of power piston 5.

Separating valves 26 and suction valves 27 are solenoid valves 3 of the slip controller of the vehicle braking system with which hydraulic block 2 is equipped. Separating valves 26 and suction valves 27 are 2/2-way solenoid valves, separating valves 26 being closed in their de-energized basic positions, and suction valves 27 being open in their de-energized basic positions. Differential pressure valve 28 is integrated, as described, into at least one of separating valves 26.

What is claimed is:

1. A hydraulic system comprising:
   a hydraulic power unit of a hydraulic power vehicle braking system including a power piston; and
   a hydraulic block including a power cylinder borehole in which the power piston is axially displaceably accommodated and sealed using a piston seal, the power cylinder borehole including a guide section that axially extends across an axial region of the hydraulic block that is at least partially on a pressure side of the piston seal in which the guide section radially guides the power piston, wherein:
   the hydraulic block includes a brake fluid channel in a circumferential surface of the power cylinder borehole, which extends through the guide section on the pressure side of the power piston up to the piston seal;
   the power cylinder borehole includes a first groove that, over a circumferential region of an interior circumferential wall of the power cylinder borehole, extends radially into the circumferential wall of the power cylinder borehole, the first groove is axially positioned within the axial region across which the guide section axially extends, the guide section extends from a first radially enlarged section of the power cylinder borehole to a second radially enlarged section of the power cylinder borehole, and a first brake fluid line opens into the first groove; and
   at least one of:
   (i) the power cylinder further includes a second groove that is axially positioned within the axial region across which the guide section axially extends via which brake fluid is suppliable to an exterior surface of the power piston; and
   (ii) the first groove is located such that, when the power piston is in a retracted position of the power piston, the first groove is axially positioned in a pressure chamber of the power cylinder borehole that (a) is delimited by a pressure-side end of the power piston and (b) whose area is reduced by a sliding of the power piston.

2. The hydraulic block as recited in claim 1, wherein the power piston, in the retracted position, rests sealingly against the piston seal.

3. The hydraulic block as recited in claim 1, wherein the piston seal includes a sealing ring, which is made entirely of an elastic material.

4. The hydraulic block as recited in claim 1, wherein the power cylinder borehole includes two piston seals in the guide section.

5. The hydraulic block as recited in claim 1, wherein the guide section of the power cylinder borehole for the power piston extends only over a portion of a length of the power cylinder borehole on the pressure side of the power piston.

6. The hydraulic block as recited in claim 1, wherein the power cylinder borehole is connected by a check valve or by a differential pressure valve and by a controllable suction valve in the hydraulic block to a master brake cylinder borehole and/or to a brake fluid reservoir.

7. The hydraulic block as recited in claim 6, wherein the check valve or the differential pressure valve is integrated into a controllable separating valve, by which a wheel brake is connected to the power cylinder borehole.

8. The hydraulic block as recited in claim 1, wherein the hydraulic block includes a power drive configured to displace the power piston in the power cylinder borehole.

9. The hydraulic block as recited in claim 1, wherein the power piston includes an end face that, in at least one axial position of the power piston, extends across an entire radial cross-section of the interior of the power cylinder borehole, and the power cylinder borehole includes an open first axial end through which the power piston extends into the hydraulic block and a closed second axial end that has an interior surface facing the end face of the power piston.

10. The hydraulic block as recited in claim 1, wherein the power cylinder includes the second groove that is axially positioned within the axial region across which the guide section axially extends via which brake fluid is suppliable to the exterior surface of the power piston.

11. The hydraulic block as recited in claim 1, wherein the first groove is located such that, when the power piston is in the retracted position of the power piston, the first groove is axially positioned in the pressure chamber of the power cylinder borehole that (a) is delimited by the pressure-side end of the power piston and (b) whose area is reduced by the sliding of the power piston.

\* \* \* \* \*